(12) United States Patent
Drake, Jr.

(10) Patent No.: US 6,457,961 B1
(45) Date of Patent: Oct. 1, 2002

(54) EASY RELEASE SYSTEM

(75) Inventor: Robert H. Drake, Jr., East Alton, IL (US)

(73) Assignee: Burlington Industries, Inc., Greensboro, NC (US)

(*) Notice: Subject to any disclaimer, the term of this patent is extended or adjusted under 35 U.S.C. 154(b) by 0 days.

(21) Appl. No.: 09/136,523

(22) Filed: Aug. 19, 1998

(51) Int. Cl.⁷ .................. B32B 3/02; D03D 27/00
(52) U.S. Cl. .................. 425/95; 428/85; 428/92
(58) Field of Search ................ 428/85, 92, 40, 428/86, 95; 52/309.7; 156/71

(56) References Cited

U.S. PATENT DOCUMENTS

| | | | |
|---|---|---|---|
| 4,010,301 A | * 3/1977 | Anderson | 428/95 |
| 4,114,346 A | * 9/1978 | Kelly | 52/746 |
| 4,337,290 A | * 6/1982 | Kelly et al. | 428/201 |
| 4,774,794 A | * 10/1988 | Grieb | 52/309.7 |
| 4,857,566 A | * 8/1989 | Helbling | 523/409 |
| 4,871,603 A | * 10/1989 | Malone | 428/95 |
| 5,160,770 A | * 11/1992 | Hoopengardner | 428/40 |
| 5,560,972 A | * 10/1996 | Blakely et al. | 428/95 |
| 5,658,430 A | * 8/1997 | Drake, Jr. et al. | 156/71 |
| 5,804,273 A | * 9/1998 | Drake, Jr. et al. | 428/86 |

OTHER PUBLICATIONS

Torrey, S., Adhesive Technology (Develoments since 1977), Noyes Data Corporation, 1980, pp. 62–63.*

* cited by examiner

Primary Examiner—Terrel Morris
Assistant Examiner—Christopher C. Pratt
(74) Attorney, Agent, or Firm—Nixon & Vanderhye

(57) ABSTRACT

Replacement of an existing permanent type commercial carpet installation is facilitated by applying a first pressure sensitive adhesive (preferably containing about 2–10% (by weight) shredded fiberglass) to an existing floor surface, e.g. using a napped roller, and applying a layer of creped kraft base paper with reinforcing yarns substantially directly to the first adhesive. The creped kraft paper layer provides a macroscopically smooth surface substantially impervious to moisture. A conventional, e.g. wet laid, carpet installation adhesive is applied in any conventional manner to the layer, and commercial carpeting is applied substantially directly to the wet laid adhesive.

14 Claims, 2 Drawing Sheets

EASY RELEASE SYSTEM

BACKGROUND AND SUMMARY OF THE INVENTION

When it is desired to replace an existing permanent-type commercial carpet installation, it is very difficult and costly to remove the existing installation and to prepare the surface for installation of a new/replacement commercial carpet. It is therefore desired to provide a commercial carpet installation and removal material and system that allows easy removal with no damage to the substrate whether in the form of wood flooring, carpet tile, or vinyl surface tile, that may exist under carpet that needs to be removed and placed.

The invention relates to a method and system for the effective installation of carpeting on a "permanent" basis (i.e. typically replaced or removed only when worn). The method and system uses commonly available components in an innovative and effective manner.

According to one aspect of the present invention, a method of installing commercial carpet over a preexisting floor covering is provided comprising the steps of: (a) Applying a first pressure sensitive adhesive to the preexisting floor covering. (b) Applying a layer of non-woven material which adheres to the first adhesive and provides a macroscopically smooth clean surface that is substantially impervious to moisture. (c) Applying a second, carpet installation, adhesive to the layer of non-woven material opposite the preexisting floor covering. And (d) applying carpeting over the second adhesive.

Step (a) may be practiced using a napped element, such as a one-quarter inch nap surface paint roller; and preferably by including about 2–10% (more preferably about 4–8%, or 5–7%—e.g. about 6%) shredded fiberglass (or a like fiber which enhances the strength of the first adhesive) in the first adhesive.

Step (b) is preferably practiced by using a creped kraft base paper with reinforcing (e.g. polyester) yarns, such as sold by Scott & Fyfe Limited of Scotland under the trademark "TEXTRON", typically having a relaxed weight of about 80–100 grams per square meter. Step (a) is typically practiced over a preexisting wood, carpet tile, or vinyl tile surface. There may be the further step of removing existing carpeting to expose underlying flooring before the practice of step (a); and/or there may be the further step (e), after the carpeting applied by step (d) is worn, of taking up the worn carpeting, second adhesive, non-woven layer and first adhesive substantially without disturbing the underlying flooring; and repeating steps (a)–(d).

According to another aspect of the present invention a flooring system is provided comprising: A first flooring surface. A first, pressure sensitive, adhesive substantially directly adhering to the first surface. A layer of non-woven material applied to the pressure sensitive adhesive and substantially directly adhered thereto and providing a surface substantially impervious to moisture. A second, carpet installation, adhesive applied to the layer of non-woven material opposite the second adhesive. And carpeting adhesively secured to the second adhesive.

Preferred features of this aspect of the invention are provided by: The first flooring surface comprises wood, carpet tile, or vinyl tile; wet laid adhesive is the second adhesive; about 2–10% shredded fiberglass, e.g. about 5–7% shredded fiberglass is used in the first adhesive. The layer of non-woven material is a creped kraft base paper with reinforcing yarns; and the first adhesive is a latex adhesive.

According to another aspect of the invention a flooring system intermediate is provided comprising a floor surface; and a pressure sensitive adhesive without about 2–10% shredded fiberglass therein disposed on said floor surface. The adhesive is preferably latex adhesive, and preferably about 5–7% (e.g. about 6%) shredded fiberglass is utilized.

It is a primary object of the present invention to provide a method and flooring system which are highly advantageous in allowing a replaceable yet "permanent" type commercial carpet installation. This and other objects of the invention will become clear from a detailed description of the invention and from the appended claims.

DETAILED DESCRIPTION OF THE DRAWINGS

Figure 1:
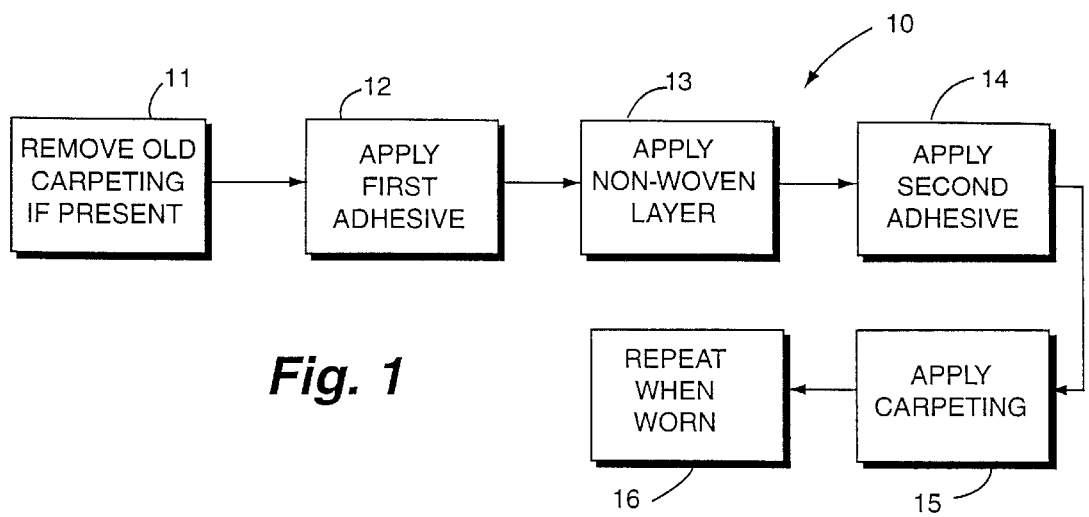
FIG. 1 is a box diagram of an exemplary method according to the present invention.

FIG. 1 schematically illustrates, generally by reference numeral 10, a method of installing commercial carpet over a preexisting floor covering, according to the invention. The floor covering typically is wood, carpet tile, vinyl tile, or the like.

A first step of the method, step 11, is practiced if there is old/worn commercial carpeting that needs to be removed. After removal of the carpeting by any suitable conventional technique, a first, pressure sensitive, adhesive is applied to the preexisting floor covering as indicated at 12 in FIG. 1. The adhesive is preferably applied with a napped element, such as a paint roller, e.g. having a quarter inch nap. The pressure sensitive adhesive is preferably a latex adhesive such as B12 available from Burlington Industries of Greensboro, N.C., under the trade name "Burlington Pressure Sensitive Adhesive". Preferably, shredded fiberglass, or a comparable strength enhancing fibrous material, is added to the adhesive. Preferably between about 2–10% (by weight), more preferably between about 5–7%, e.g. about 6%, shredded fiberglass is added to the adhesive.

The next step, 13, is applying a layer of non-woven material which adheres to the first adhesive applied at 12, and provides a macroscopically smooth, clean surface that is substantially impervious to moisture. Preferably this step 13 is practiced by applying a creped kraft base paper with reinforcing yarns (e.g. polyester yarn). One particularly suitable material is sold under the trademark "TEXTRON" by Scott & Fyfe Limited of Fyfe, Scotland. Such a material typically has a relaxed weight of about 80–100 grams per square meter.

The next step, 14, is to apply a second adhesive over the layer applied at step 13. For example, the adhesive may be "wet set" water based adhesive from Lees Commercial Carpets, Greensboro, N.C.

After the second adhesive application step 14 new commercial carpeting is applied over the second adhesive 15 in a conventional manner. As indicated at step 16 after the carpeting applied at 15 is worn, the worn carpeting, second adhesive, non-woven layer, and B12 first adhesive can be taken up substantially without disturbing the underlying flooring, and the steps discussed above can be repeated.

Figure 2:
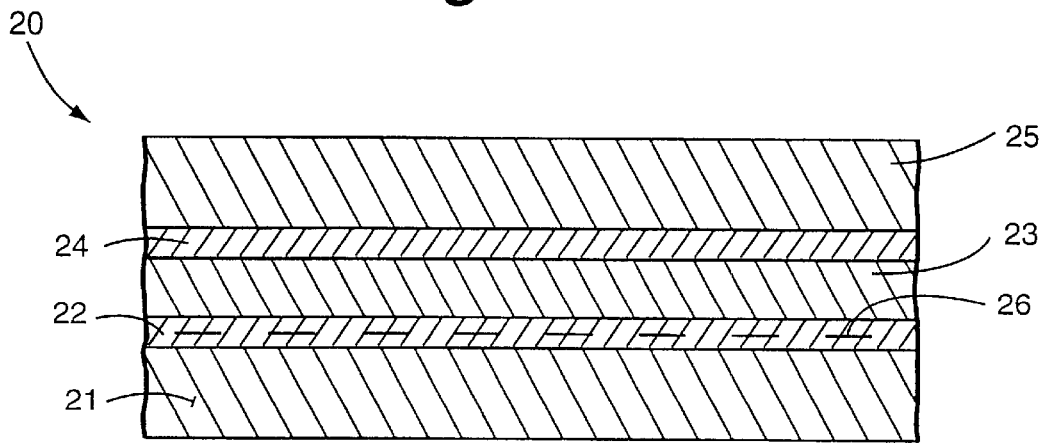
FIG. 2 is a side cross-sectional view of the flooring system according to the invention.

FIG. 2 schematically illustrates an exemplary flooring system according to the present invention, generally by reference numeral 20. The flooring system 20 includes a preexisting flooring 21 which may be wood, carpet tile, vinyl tile, or the like, with a first pressure sensitive adhesive 22 applied thereon (preferably substantially directly thereto), and with the non-woven layer 23 applied substantially directly to the first adhesive 22. The second adhesive 24 preferably is applied substantially directly to the layer 23, and the new commercial carpeting 25 is preferably applied substantially directly to the second layer of adhesive 24. FIG. 2 is schematic so that the various thicknesses of the layers are exaggerated in some cases, or minimized in others, for clarity of illustration. The optional, but preferred, reinforcing fibers for the adhesive 22 are shown schematically at 26 in FIG. 2.

FIG. 2 also shows a flooring system intermediate according to the invention comprising the floor surface defined by the flooring 21 and the pressure sensitive adhesive 22 with about 2–10% (e.g. about 5–7%) shredded fiberglass therein disposed on the floor 21, the adhesive 22 preferably being a latex adhesive.

Figure 3:
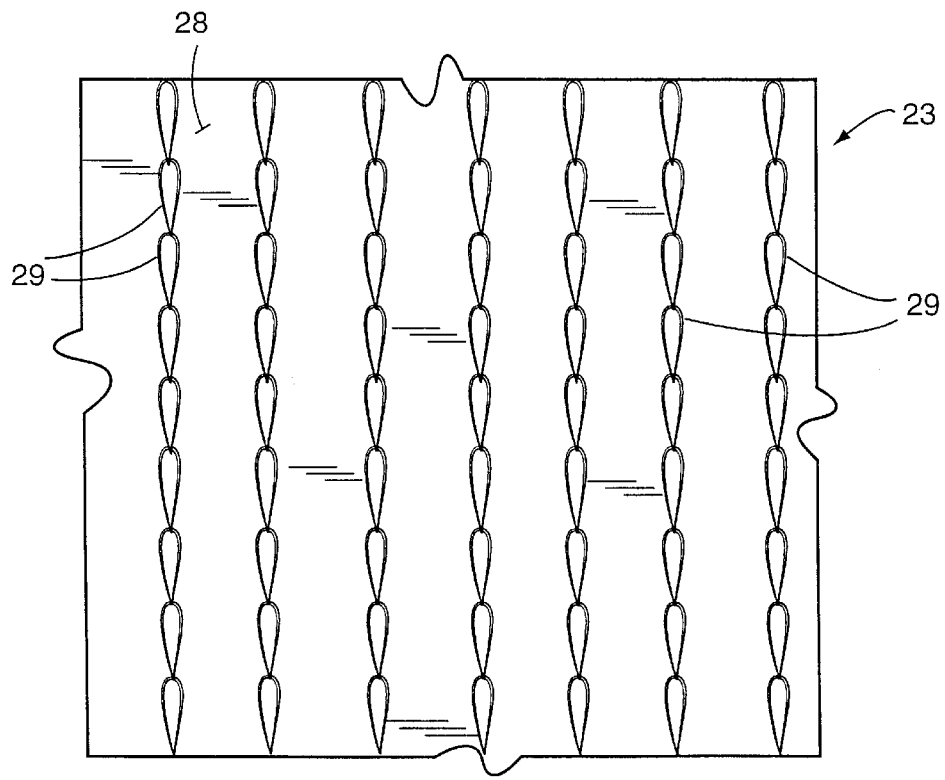
FIGS. 3 and 4 are top and bottom plan views of an exemplary non-woven layer used in the practice of the present invention.
Figure 4:
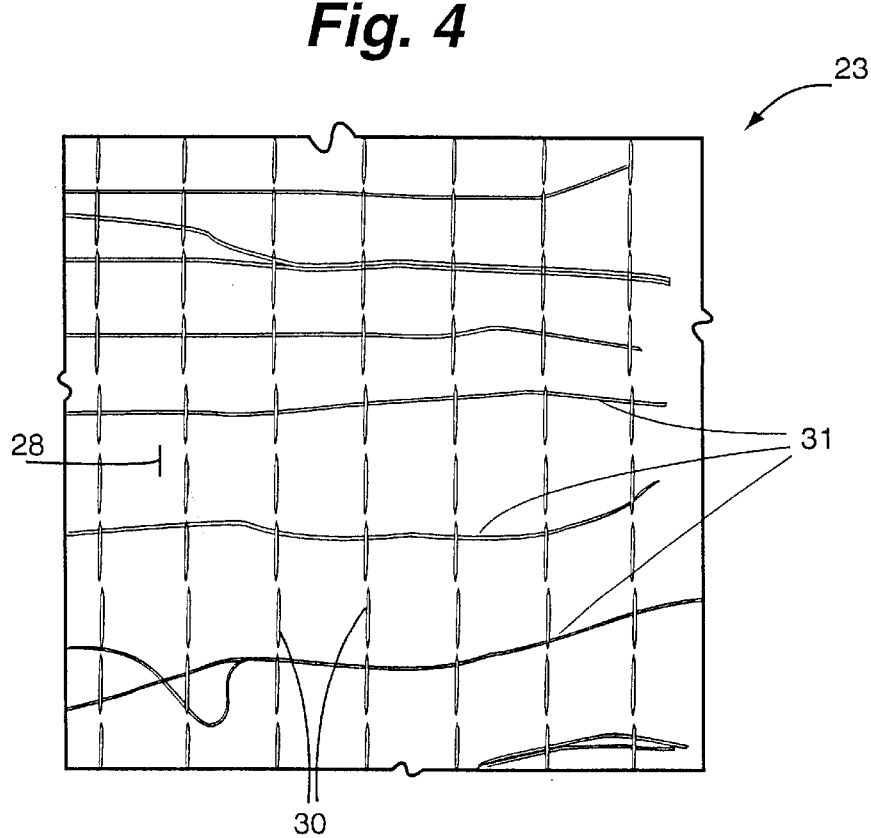

An exemplary material that forms the layer 23—namely the "TEXTRON" material described above—is schematically illustrated in top and bottom view in FIGS. 3 and 4, respectively. The non-woven layer 23 comprises creped kraft paper 28 with stitching (preferably polyester) 29 on the top face (FIG. 3), the stitching visible at 30 on the back face of FIG. 4. Weft reinforcing threads 31 are also provided, extending generally transverse to the stitching 29, 30, as seen in FIG. 4. The main advantage of the weft 31 is in tear strength, and providing processability with stentor pins.

It will thus be seen that according to the present invention an advantageous method and flooring system have been provided, particularly for facilitating replaceable "permanent type" commercial carpeting. While the invention has been herein shown and described in what is presently conceived to be the most practical and preferred embodiment thereof, it will be apparent to those of ordinary skill in the art that many modifications may be made thereof within the scope of the invention, which scope is to be accorded the broadest interpretation of the appended claims so as to encompass all equivalent methods and systems.

What is claimed is:

1. A flooring system comprising:

a first flooring surface;

a first pressure sensitive, adhesive substantially directly adhering to said first surface;

a layer of non-woven material applied to said pressure sensitive adhesive and substantially directly adhered thereto and providing a surface substantially impervious to moisture, said non-woven layer comprising a creped kraft base paper with reinforcing yarns;

a second, carpet installation, adhesive applied to said layer of non-woven material on a side thereof opposite said first adhesive; and carpeting adhesively secured to said second adhesive.

2. A flooring system as recited in claim 1 wherein said first flooring surface comprises wood, carpet tile, or vinyl tile.

3. A flooring system as recited in claim 2 wherein said second adhesive comprises a wet laid adhesive.

4. A flooring system as recited in claim 1 wherein first said adhesive includes about 2–10%, by weight, shredded fiberglass.

5. A flooring system as recited in claim 4 wherein about 5–7% shredded fiberglass is provided.

6. A flooring system as recited in claim 4 wherein said first adhesive is latex adhesive.

7. A flooring system as recited in claim 1 wherein said first flooring surface comprises carpet tile.

8. A flooring system as recited in claim 1 wherein said first flooring surface comprises vinyl tile.

9. A flooring system as recited in claim 8 wherein said first adhesive includes about 5–7%, by weight, shredded fiberglass.

10. A flooring system as recited in claim 1 wherein said second adhesive comprises a wet laid adhesive.

11. A flooring system as recited in claim 10 wherein said first adhesive includes about 2–10%, by weight, shredded fiberglass.

12. A flooring system as recited in claim 11 wherein about 5–7% shredded fiberglass is provided.

13. A flooring system as recited in claim 1 wherein said first adhesive is latex adhesive.

14. A flooring system as recited in claim 13 wherein said first flooring surface comprises wood, carpet tile, or vinyl tile.

\* \* \* \* \*